No. 834,782. PATENTED OCT. 30, 1906.
J. WEBER, Sr.
JOINT CLAMP.
APPLICATION FILED MAR. 29, 1905.
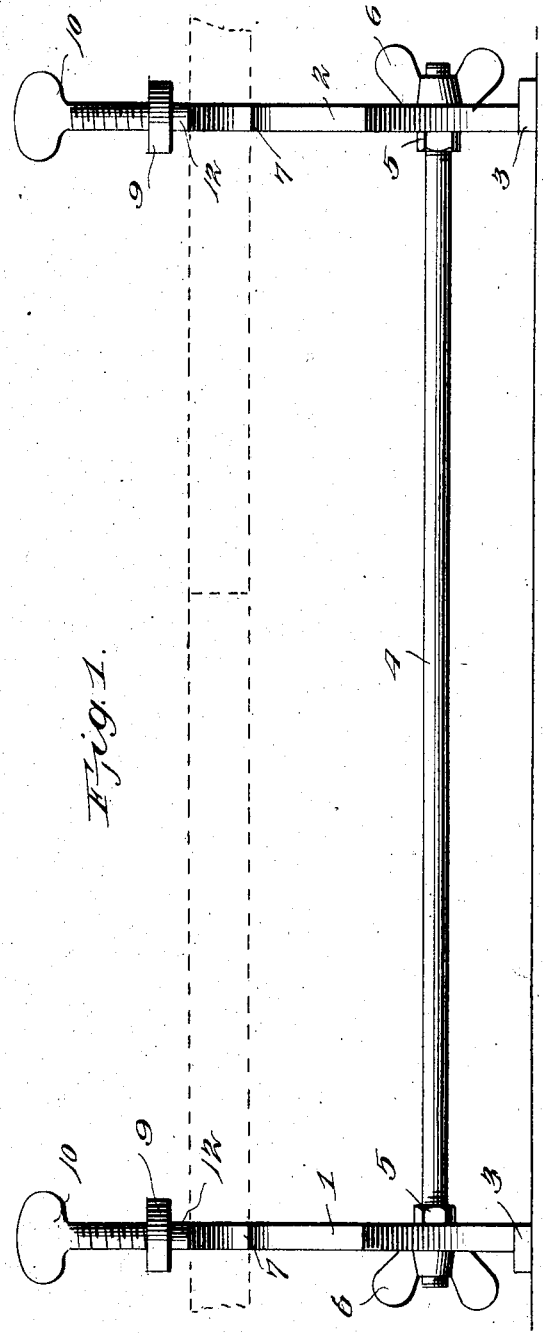
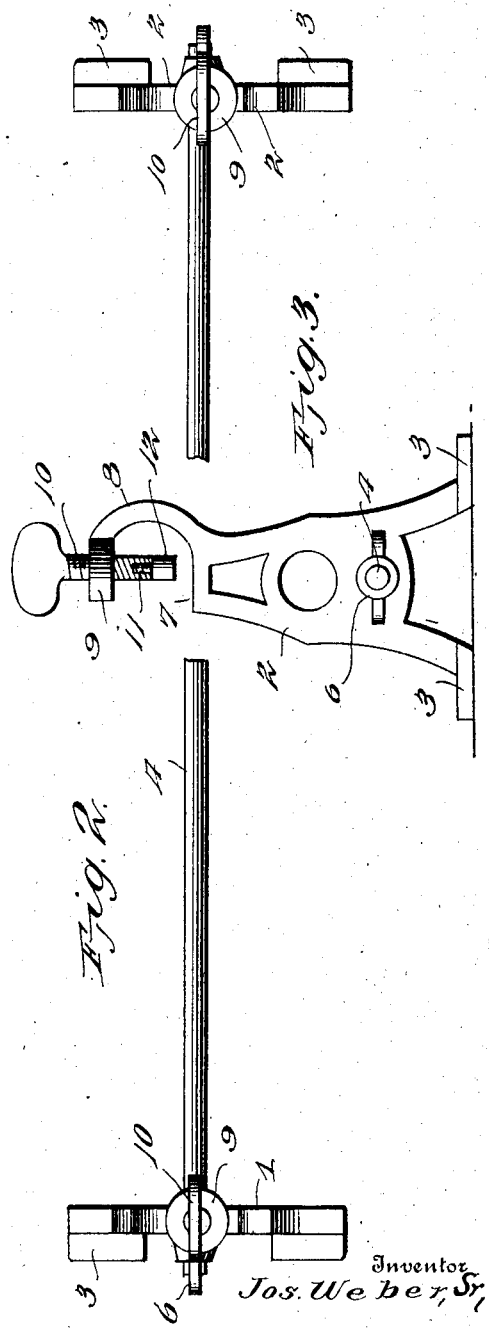
Witnesses
F. B. Hoffman
C. C. Hines
Inventor
Jos. Weber, Sr.
By Victor J. Evans
Attorney

UNITED STATES PATENT OFFICE.

JOSEPH WEBER, SR., OF PHILADELPHIA, PENNSYLVANIA.

JOINT-CLAMP.

No. 834,782.          Specification of Letters Patent.          Patented Oct. 30, 1906.

Application filed March 29, 1905. Serial No. 252,789.

*To all whom it may concern:*

Be it known that I, JOSEPH WEBER, Sr., a citizen of the United States, residing at Philadelphia, in the county of Philadelphia and State of Pennsylvania, have invented new and useful Improvements in Joint-Clamps, of which the following is a specification.

This invention relates to improvements in adjustable brackets or clamps especially designed for the use of plumbers and other mechanics for holding the ends of pipes, couplings, and other plumbing fixtures in position while the same are being soldered or otherwise joined and during the operation of wiping the joints.

The object of the invention is to provide a device of this character which is simple of construction, inexpensive of production, reliable and effective in use, and adapted for clamping different sizes of pipes or other parts rigidly in position for the work to be performed thereon.

In the accompanying drawings, Figure 1 is a side elevation of my improved clamping device. Fig. 2 is a top plan view thereof, a portion of the tie rod or bolt being broken away. Fig. 3 is an end elevation with a portion of one of the clamping-screws shown in section to disclose the connection of the clamping-head therewith.

The numerals 1 and 2 in the drawings represent a pair of supporting brackets or standards, provided at their lower ends with supporting-feet 3, which, if desired, may be apertured or otherwise suitably constructed for the engagement of fastenings therewith to secure the same to a work-bench or other support. The brackets are apertured for the reception of the threaded ends of a tie bolt or rod 4, which holds them assembled in proper spaced relation. This tie-bolt carries set-nuts 5, bearing against the inner sides of the standards, and winged clamping-nuts 6, engaging the outer sides of the standards to firmly and detachably connect the parts together.

Each standard is provided at its upper end with a seat 7, on which the pipe or other object to be supported is rested, and with a curved arm 8, carrying at its upper end an internally-threaded fixed nut or eye 9, in which operates a clamping-screw 10, overlying the seat 7. Each of these screws 10 is formed at its lower end with a threaded socket to receive a threaded stem or tang 11 upon a clamping-head 12, carried thereby. The head 12 is adapted to bear against the upper surface of the pipe or other object diametrically opposite the seat 7 and clamp the same against the latter and is preferably made of some suitable soft metal, such as lead, to prevent the pipe clamped from being marked or marred when said head is in clamping engagement therewith. The detachable connection of the head with the screw permits of its ready disconnection when worn or mutilated and the substitution of a new head therefor, as will be readily understood.

By means of my invention two pipes whose ends are to be soldered or joined may be securely clamped in position for joining and wiping and held in rigid relation while the work is being performed, as indicated in dotted lines in Fig. 1, and the construction is such as to permit of its manufacure at a low cost and its ready transportation from place to place. Other advantages incident to its construction will be readily apparent to those versed in the art.

Having thus described my invention, what I claim as new is—

A joint-clamp comprising a pair of supporting-brackets spaced apart and detachably secured together, a tie-rod having its ends extending through the brackets, set-nuts on the rod, winged nuts for clamping the set-nuts against the inner faces of the brackets whereby the brackets and rod are detachably connected for ready assemblage and dissemblage, each bracket being also provided with a flat seat, a semicircular arm extending laterally from one side of the seat, a threaded bearing on the terminal of said arm and overhanging the seat, said seat and said arm being spaced apart to form an opening between the same for the reception of a pipe, a clamping-screw mounted in the threaded bearing and having a screw-threaded socket extending vertically into its lower end, and a soft-metal bearing-jaw constructed of the same diameter as the clamping-screw and provided with a threaded stem detachably connected to said socket, substantially as specified.

In testimony whereof I have signed my name to this specification in presence of two subscribing witnesses.

JOSEPH WEBER, SR.

Witnesses:
  FRANK M. BLAIR,
  IGNATIUS MARTINEZ.